(12) United States Patent
Becker et al.

(10) Patent No.: US 11,901,536 B2
(45) Date of Patent: Feb. 13, 2024

(54) BATTERY UNIT WITH TEMPERATURE-REGULATING MEANS BUILT INTO THE HOUSING

(71) Applicant: SOGEFI AIR & COOLING, Guyancourt (FR)

(72) Inventors: Nicolas Becker, Porte du Ried (FR); Alexandre Floranc, Logelsheim (FR)

(73) Assignee: SOGEFI AIR & COOLING, Guyancourt (FR)

( * ) Notice: Subject to any disclaimer, the term of this patent is extended or adjusted under 35 U.S.C. 154(b) by 516 days.

(21) Appl. No.: 17/044,986

(22) PCT Filed: Apr. 8, 2019

(86) PCT No.: PCT/EP2019/058801
§ 371 (c)(1),
(2) Date: Oct. 2, 2020

(87) PCT Pub. No.: WO2019/197335
PCT Pub. Date: Oct. 17, 2019

(65) Prior Publication Data
US 2021/0167445 A1    Jun. 3, 2021

(30) Foreign Application Priority Data
Apr. 10, 2018   (FR) ...................................... 1853129

(51) Int. Cl.
*H01M 10/6568* (2014.01)
*H01M 10/613* (2014.01)
(Continued)

(52) U.S. Cl.
CPC .......... *H01M 10/6568* (2015.04); *B60K 6/28* (2013.01); *B60L 50/64* (2019.02); *B60L 58/24* (2019.02);
(Continued)

(58) Field of Classification Search
CPC .......... H01M 10/6568; H01M 10/613; H01M 10/625; H01M 10/6556; H01M 10/60;
(Continued)

(56) References Cited

U.S. PATENT DOCUMENTS

| 5,443,926 A | 8/1995 | Holland et al. |
| 8,389,145 B2 * | 3/2013 | Graban ............. H01M 10/6551 429/163 |

(Continued)

FOREIGN PATENT DOCUMENTS

| CN | 203260693 | 4/2013 |
| CN | 107293661 | 4/2016 |

OTHER PUBLICATIONS

International Search Report dated May 20, 2019.
Search Report dated Feb. 2, 2020.
Japanese Office Action dated Mar. 22, 2023.

*Primary Examiner* — James M Dolak
(74) *Attorney, Agent, or Firm* — Sofer & Haroun, LLP

(57) ABSTRACT

The invention relates to a battery unit (1), particularly for a hybrid and/or electric motor vehicle, comprising a plurality of cells that are physically and/or electrically regrouped into a plurality of modules, a housing receiving and surrounding said cells, and means for regulating the temperature of said cells by circulation of a heat-transfer fluid. Said battery unit (1) is characterised in that the housing is made of a plastic material and consists of a lower tray (6), with a bottom and side walls, and an upper cover (7), which are peripherally assembled, and in that at least the tray (6) comprises means (5) for distribution/collection and circulation of the heat-transfer fluid, said means being structurally built into the body of said tray (6), by being formed at least partially as one piece therewith.

17 Claims, 15 Drawing Sheets

(51) Int. Cl.
*H01M 10/625* (2014.01)
*H01M 10/6556* (2014.01)
*B60L 50/64* (2019.01)
*B60L 58/24* (2019.01)
*H01M 50/249* (2021.01)
*H01M 50/227* (2021.01)
*H01M 50/209* (2021.01)
*H01M 50/244* (2021.01)
*B60K 6/28* (2007.10)
*H01M 50/24* (2021.01)

(52) U.S. Cl.
CPC ....... *H01M 10/613* (2015.04); *H01M 10/625* (2015.04); *H01M 10/6556* (2015.04); *H01M 50/209* (2021.01); *H01M 50/227* (2021.01); *H01M 50/24* (2021.01); *H01M 50/244* (2021.01); *H01M 50/249* (2021.01); *B60Y 2200/91* (2013.01); *B60Y 2200/92* (2013.01); *B60Y 2400/112* (2013.01); *H01M 2220/20* (2013.01)

(58) Field of Classification Search
CPC ........... H01M 10/6567; H01M 10/656; H01M 50/249; H01M 50/227; H01M 50/209; H01M 50/244; H01M 50/20; H01M 2220/20; B60L 50/64; B60L 58/24; B60L 58/26; B60K 6/28; B60Y 2200/91; B60Y 2200/92; B60Y 2400/112
See application file for complete search history.

(56) References Cited

U.S. PATENT DOCUMENTS

| | | | | |
|---|---|---|---|---|
| 8,790,808 | B2 * | 7/2014 | Herrmann | H01M 10/625 |
| | | | | 165/104.33 |
| 9,052,168 | B1 * | 6/2015 | Rawlinson | H01M 50/224 |
| 9,083,009 | B2 * | 7/2015 | Heckenberger | H01M 10/647 |
| 9,373,873 | B2 * | 6/2016 | Lev | H01M 10/613 |
| 9,452,683 | B2 * | 9/2016 | Jairazbhoy | B60L 50/50 |
| 9,531,045 | B2 * | 12/2016 | Girmscheid | F28F 3/042 |
| 9,546,827 | B2 * | 1/2017 | Ludwig | H01M 10/6556 |
| 9,577,227 | B2 * | 2/2017 | Sumpf | H01M 50/204 |
| 9,793,585 | B2 * | 10/2017 | Obasih | H01M 10/6556 |
| 9,896,822 | B2 * | 2/2018 | Kohno | H01M 10/6567 |
| 10,205,144 | B2 * | 2/2019 | Lee | H01M 50/271 |
| 10,274,259 | B2 * | 4/2019 | Palanchon | H01M 10/625 |
| 10,367,241 | B2 * | 7/2019 | Enning | H01M 10/625 |
| 10,665,832 | B2 * | 5/2020 | Kim | H01M 50/505 |
| 10,749,223 | B2 * | 8/2020 | Lu | H01M 10/653 |
| 10,892,528 | B2 * | 1/2021 | Yoo | H01M 10/6551 |
| 11,155,150 | B2 * | 10/2021 | Stephens | B60K 11/02 |
| 11,171,372 | B2 * | 11/2021 | Pucher | H01M 50/204 |
| 11,223,080 | B2 * | 1/2022 | Kellner | H01M 50/24 |
| 11,302,973 | B2 * | 4/2022 | Maguire | H01M 10/6556 |
| 11,349,164 | B2 * | 5/2022 | Burgers | F28F 3/025 |
| 11,362,381 | B2 * | 6/2022 | Biel, Jr. | H01M 50/207 |
| 11,437,682 | B2 * | 9/2022 | Takano | H01M 50/367 |
| 11,495,849 | B2 * | 11/2022 | Wünsche | H01M 50/209 |
| 11,502,360 | B2 * | 11/2022 | Haeusler | H01M 50/224 |
| 11,509,001 | B2 * | 11/2022 | Jiang | H01M 50/278 |
| 11,511,648 | B2 * | 11/2022 | Yoshida | B60L 50/64 |
| 11,545,710 | B2 * | 1/2023 | Zeng | H01M 50/204 |
| 11,658,357 | B2 * | 5/2023 | Bourgeais | H01M 10/6567 |
| | | | | 429/120 |
| 11,664,544 | B2 * | 5/2023 | Becker | H01M 50/204 |
| | | | | 429/120 |
| 11,670,814 | B2 * | 6/2023 | Kubota | H01M 10/0486 |
| | | | | 429/96 |
| 2005/0170241 | A1 * | 8/2005 | German | H01M 10/663 |
| | | | | 429/120 |
| 2009/0023056 | A1 * | 1/2009 | Adams | B60L 58/25 |
| | | | | 29/890.035 |
| 2014/0011059 | A1 * | 1/2014 | Hashimoto | B60L 1/003 |
| | | | | 429/72 |
| 2015/0263397 | A1 * | 9/2015 | Janarthanam | H01M 10/613 |
| | | | | 429/120 |
| 2015/0283965 | A1 * | 10/2015 | Lynds | H01M 10/613 |
| | | | | 361/434 |
| 2016/0190664 | A1 * | 6/2016 | Frohnmayer | H01M 10/6557 |
| | | | | 429/120 |
| 2016/0211558 | A1 * | 7/2016 | Ma | H01M 10/654 |
| 2019/0131674 | A1 | 5/2019 | Lu et al. | |

\* cited by examiner

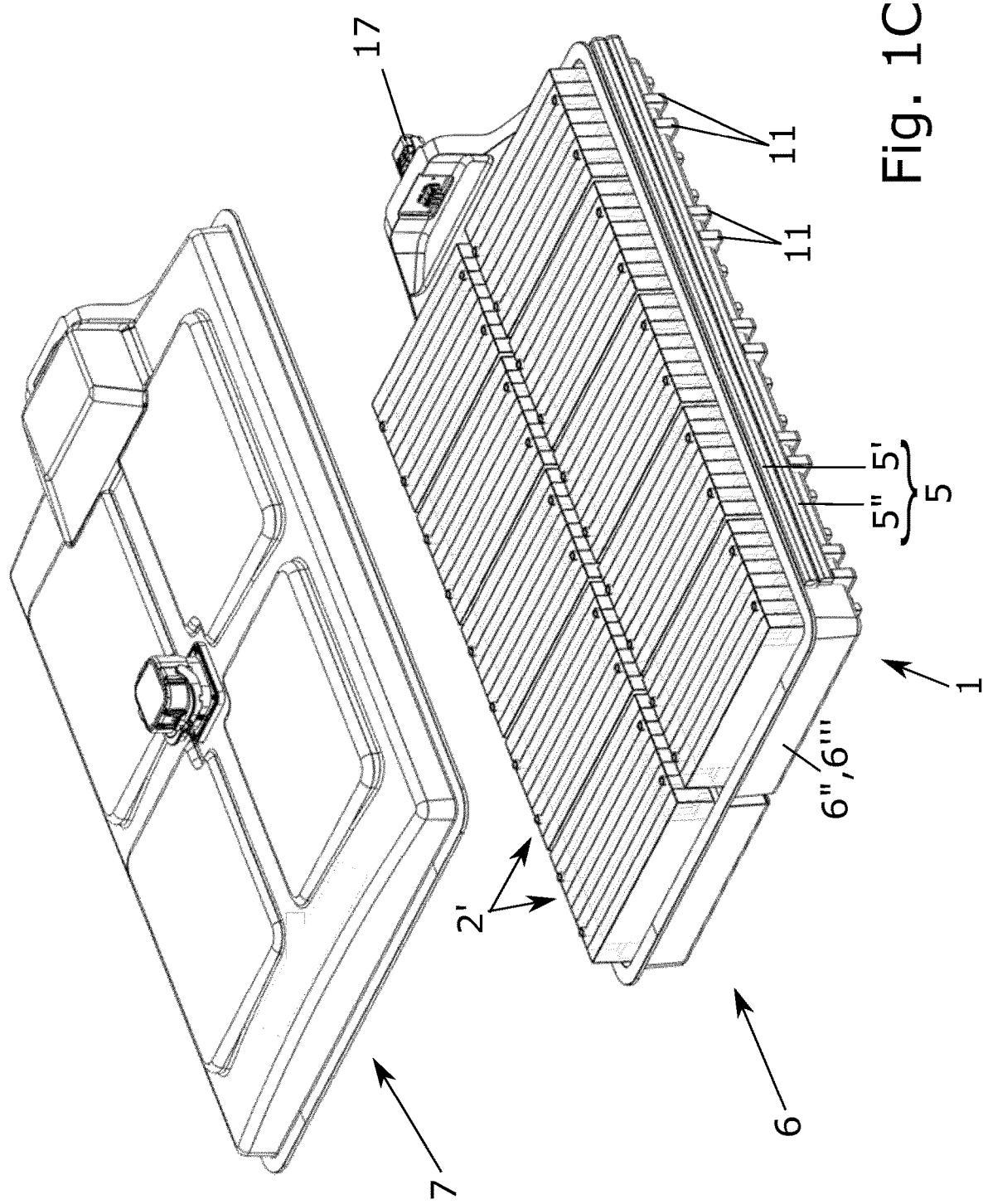

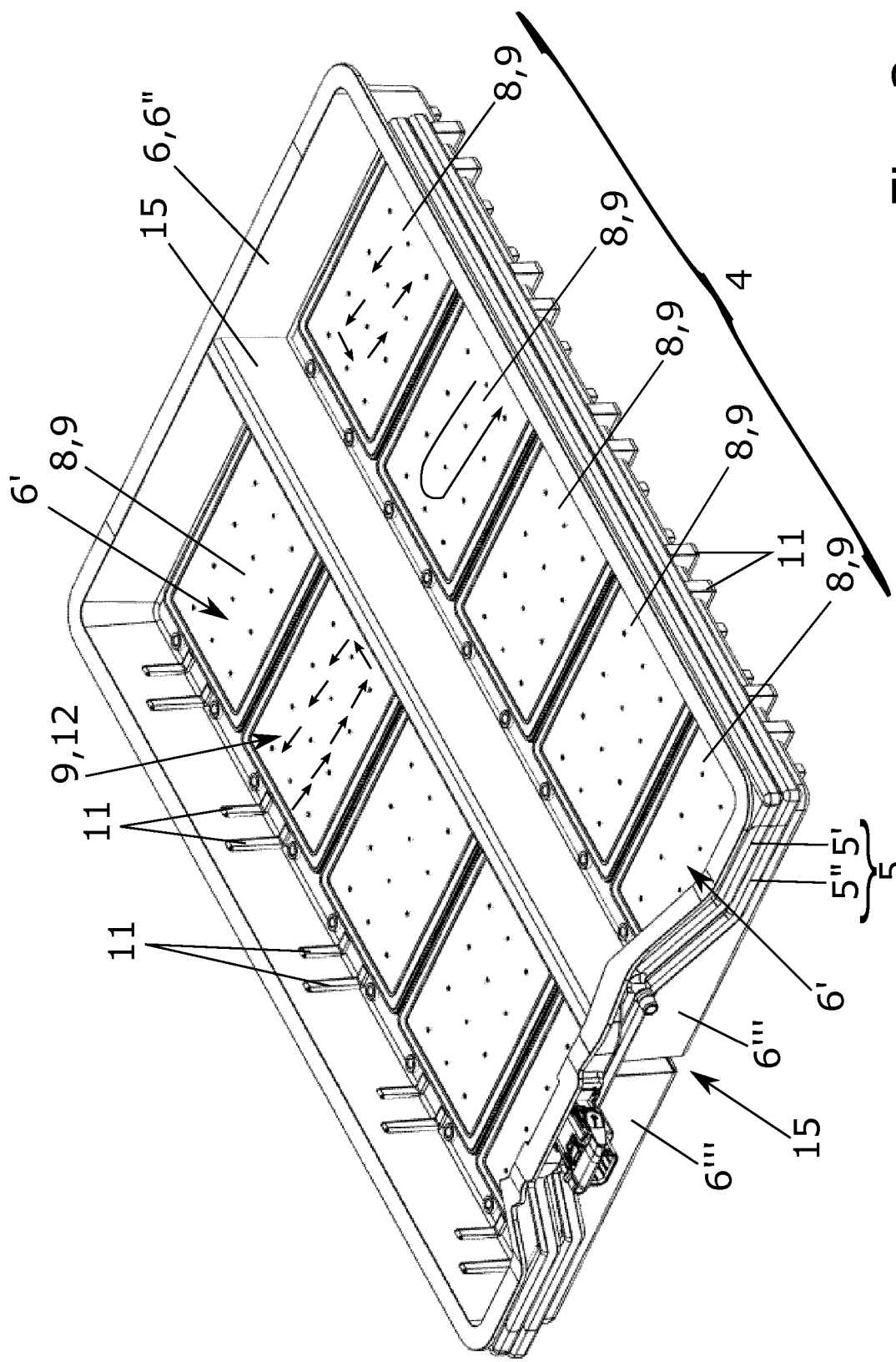

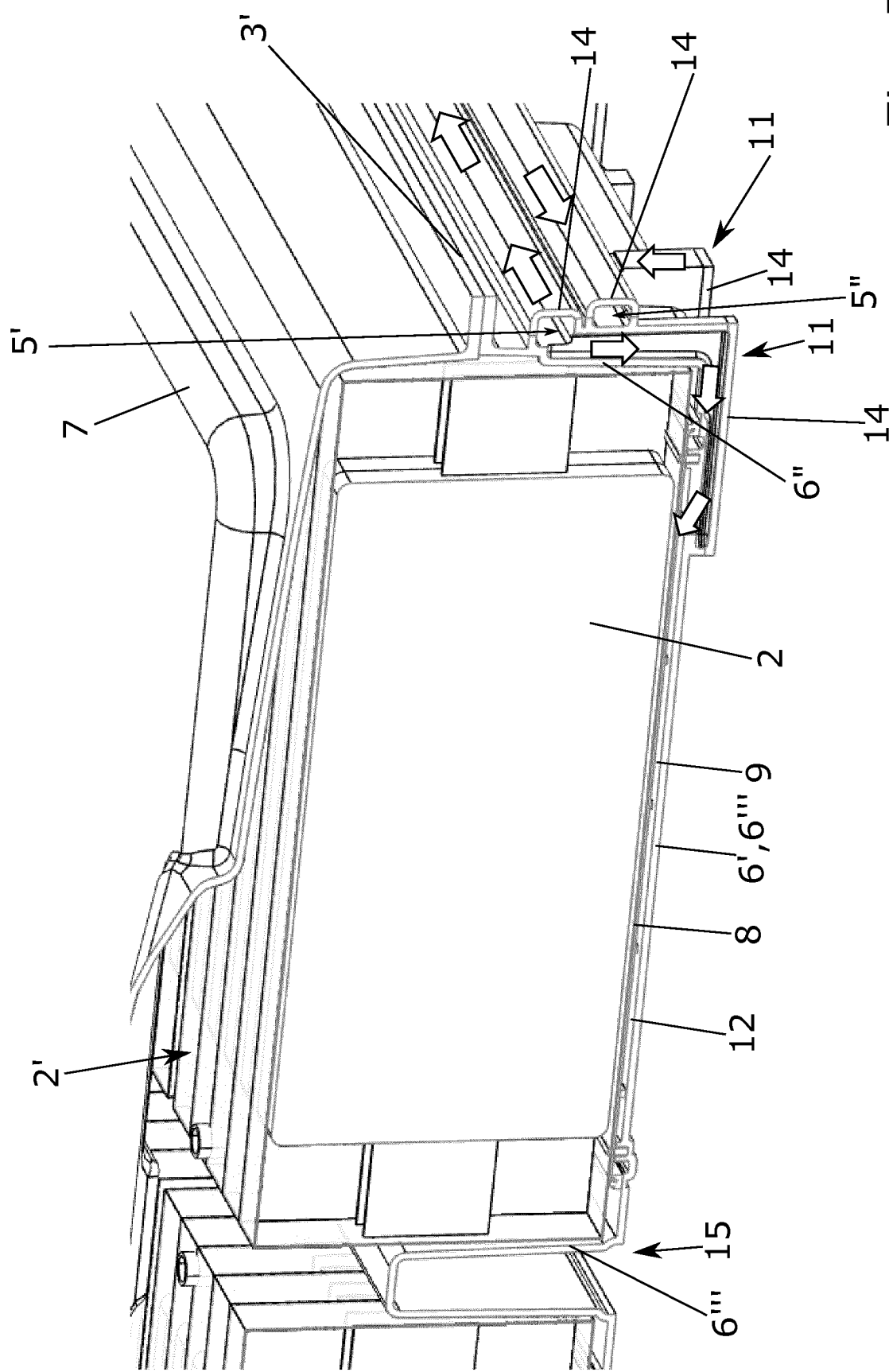

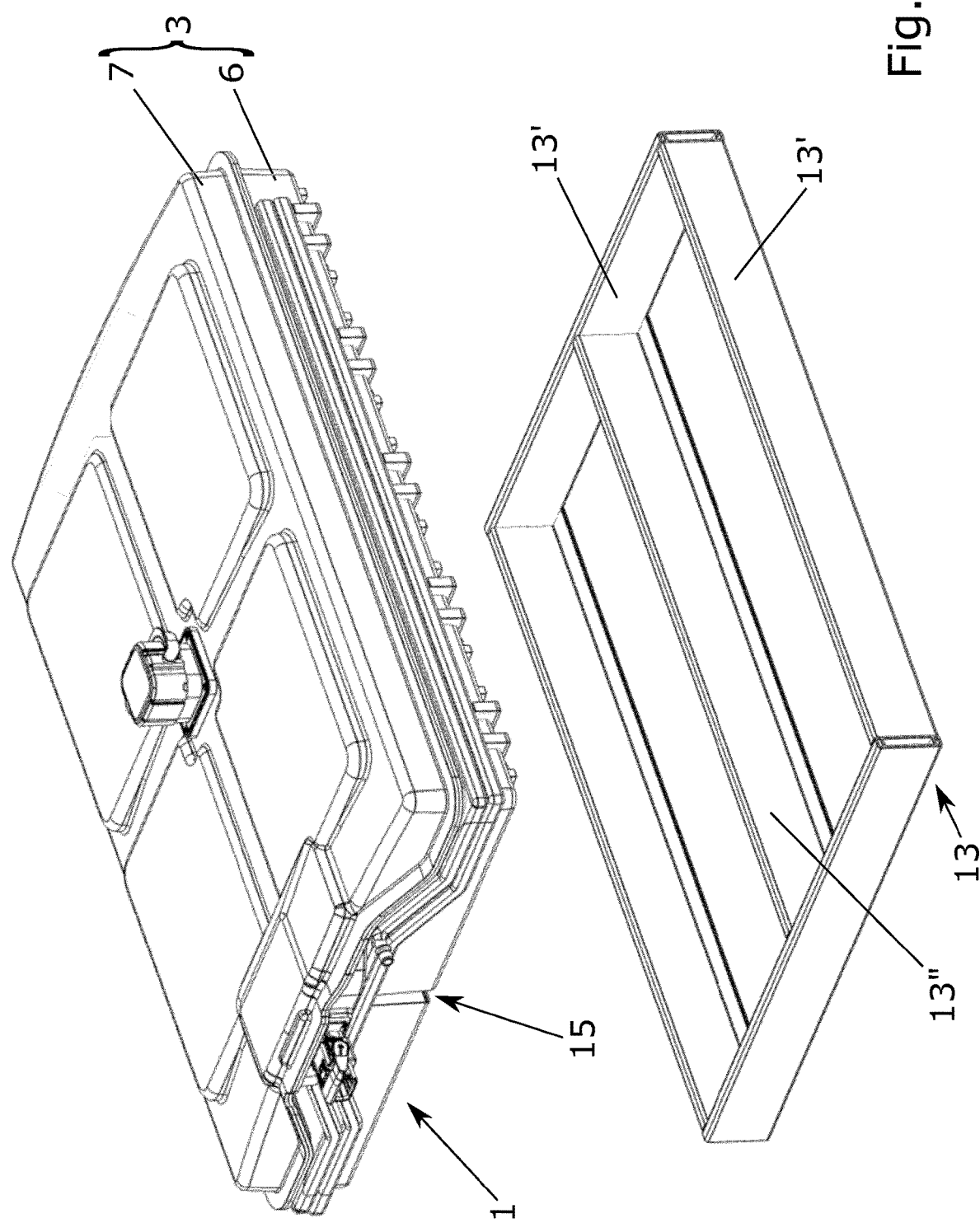

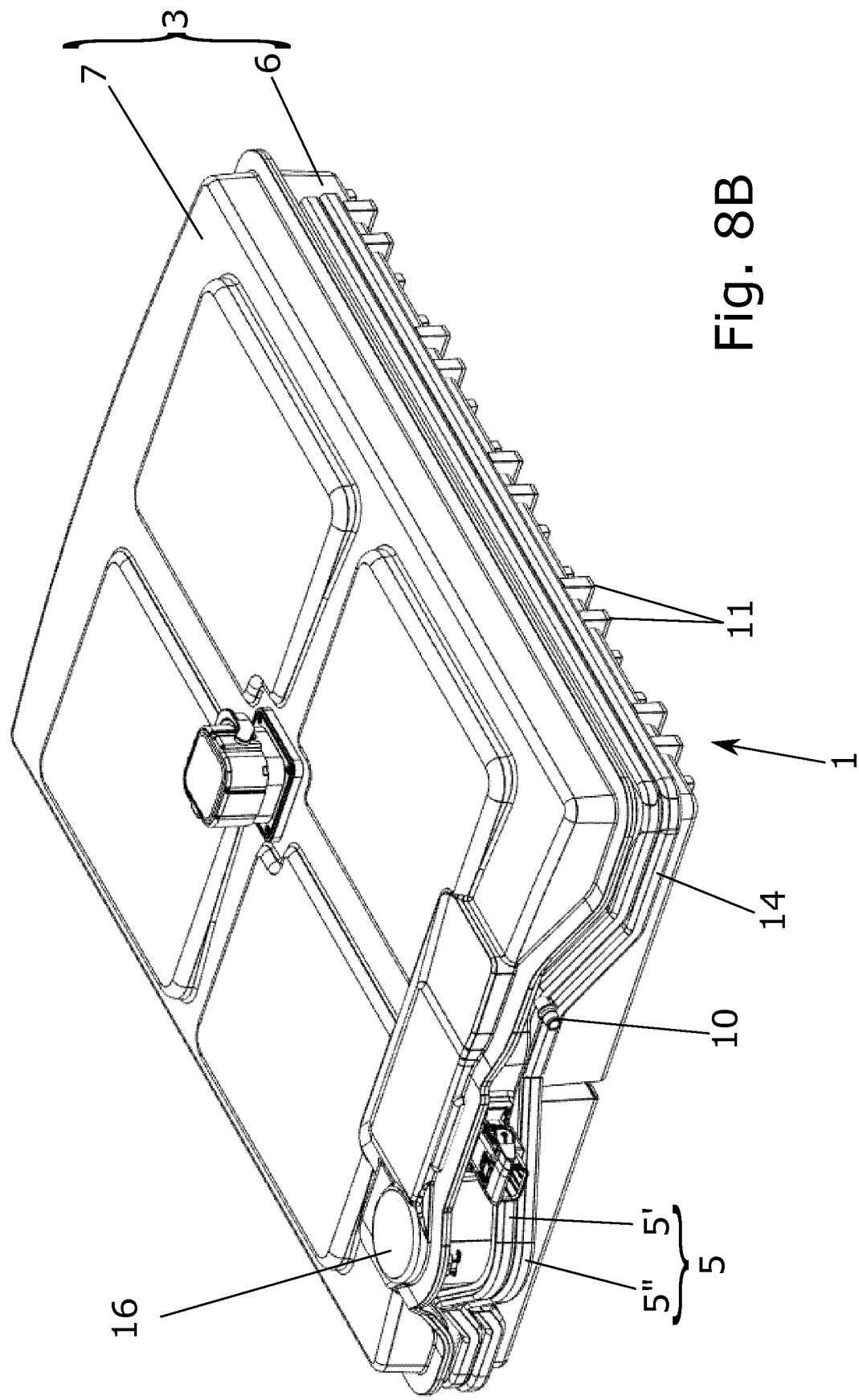

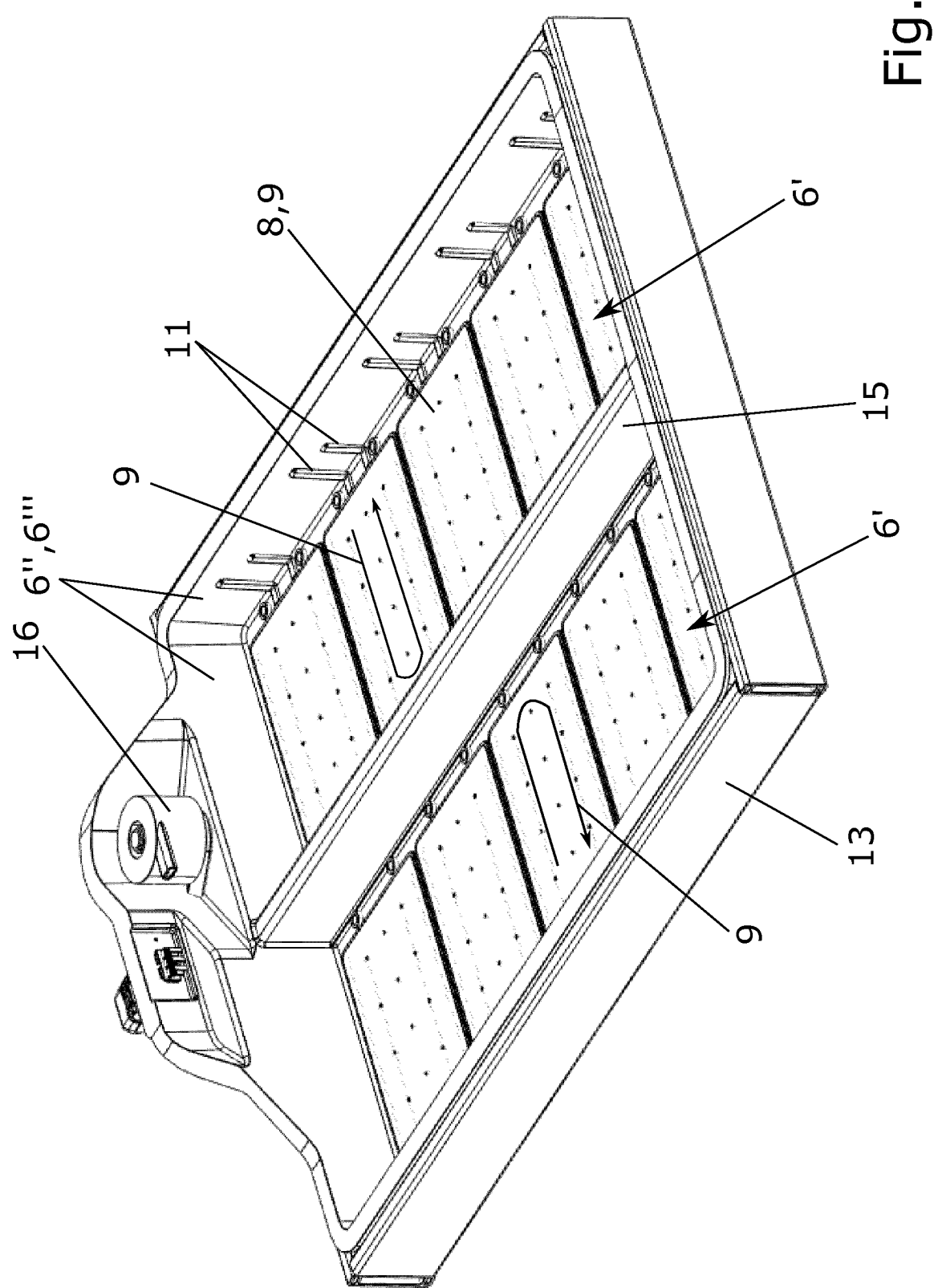

BATTERY UNIT WITH TEMPERATURE-REGULATING MEANS BUILT INTO THE HOUSING

RELATED APPLICATION

This application is a National Phase of PCT/EP2019/058801 filed on Apr. 8, 2019 which claims the benefit of priority from French Patent Application No. FR 18 53129 filed on Apr. 10, 2018, the entirety of which are incorporated by reference.

BACKGROUND

Field of the Invention

The present invention relates to the field of autonomous electrical energy sources, in particular those on board motor vehicles, and its subject is a battery unit and a hybrid or electric motor vehicle comprising at least one such unit.

Description of the Related Art

Hybrid/electric vehicles are equipped with a battery that makes it possible to store the electrical energy necessary to their operation. The current issues require the design of the battery units, also called "battery packs", to be optimized, in order to obtain the best performance levels in terms of life span (charge/discharge) and operating autonomy therefrom. The charge time is also an important factor in the daily use of these battery packs.

The batteries implemented ideally need to operate at temperatures between 10° C. and 30° C., in particular the high-density storage batteries, of the Li-ion or Li-polymer type for example. An excessively low temperature impacts the autonomy and an excessively high temperature impacts the life span of the batteries. It is therefore necessary to regulate the temperature of the batteries to the best possible extent.

In the context of applications on board vehicles, there are battery solutions that are air-cooled but the heat exchange remains fairly limited. The current trend is to use a heat-transfer fluid in order to enhance the heat exchanges and increase the efficiency of the regulation.

Furthermore, the housings receiving these batteries can be realized directly by a part of the vehicle or consist of cavities formed in a structural part of this vehicle. However, these solutions are very inflexible in terms of installation and make maintenance difficult. The battery pack solutions that are autonomous and not incorporated in the structure of the vehicle are therefore to be preferred.

Many designs exist in the state of the art: they use metallic solutions (steel, aluminum, etc.) with a distribution of heat-transfer fluid by hoses to cooling plates assembled and disposed inside the battery pack, on which the modules combining the cells or elements of the battery are arranged.

The result thereof is a complex construction, formed by the assembly of a large number of parts, requiring the production of numerous tight connections during production (whose aging resistance may be problematic) and forming a structure that is bulky with many components.

Furthermore, since the housing of the battery unit is made of metal (preferentially of aluminum), it cannot thermally and electrically insulate the battery pack to the outside, in addition has a high cost price and is subject to corrosion.

OBJECTS AND SUMMARY

The aim of the present invention is to overcome at least the abovementioned main limitations.

To this end, the subject of the invention is a battery unit, notably for a hybrid and/or electric motor vehicle, essentially comprising, on the one hand, a plurality of battery cells or elements, if necessary grouped together physically and/or electrically in several blocks or modules, on the other hand, a housing accommodating and surrounding said cells or elements and, finally, means for regulating the temperature of said cells or elements by circulation of heat-transfer fluid, said battery unit being characterized in that the housing is made of a plastic material and consists of a bottom tray, with a bottom and lateral walls, and of a top cover, which are assembled peripherally, preferentially by screwing, and in that at least the tray comprises means for distributing/collecting and circulating the heat-transfer fluid which are incorporated structurally in the body of said tray by being preferentially formed at least partially of a single piece therewith.

BRIEF DESCRIPTION OF THE DRAWINGS

The invention will be better understood by means of the following description, which relates to preferred embodiments, given as nonlimiting examples, and explained with reference to the attached schematic drawings, in which:

FIG. 1C is a view of this unit before assembly of the two components of the housing;

FIG. 3 is a view similar to that of FIG. 2, the battery cells or elements being removed and only the bottom tray being represented;

FIG. 5 is a partial cross-sectional view of the battery unit represented in FIGS. 1 and 4, the circulation of the heat-transfer fluid being schematically represented;

FIGS. 7A and 7B are perspective views of a battery unit as represented in FIG. 1, before and after its assembly with an added reinforcing structure;

FIGS. 8A and 8B are views similar to FIG. 1A of two other variant embodiments of the battery unit according to the invention;

FIG. 9 is a perspective view of the bottom tray forming part of the housing of the battery unit represented in FIG. 8B.

DETAILED DESCRIPTION

Figure 1A:
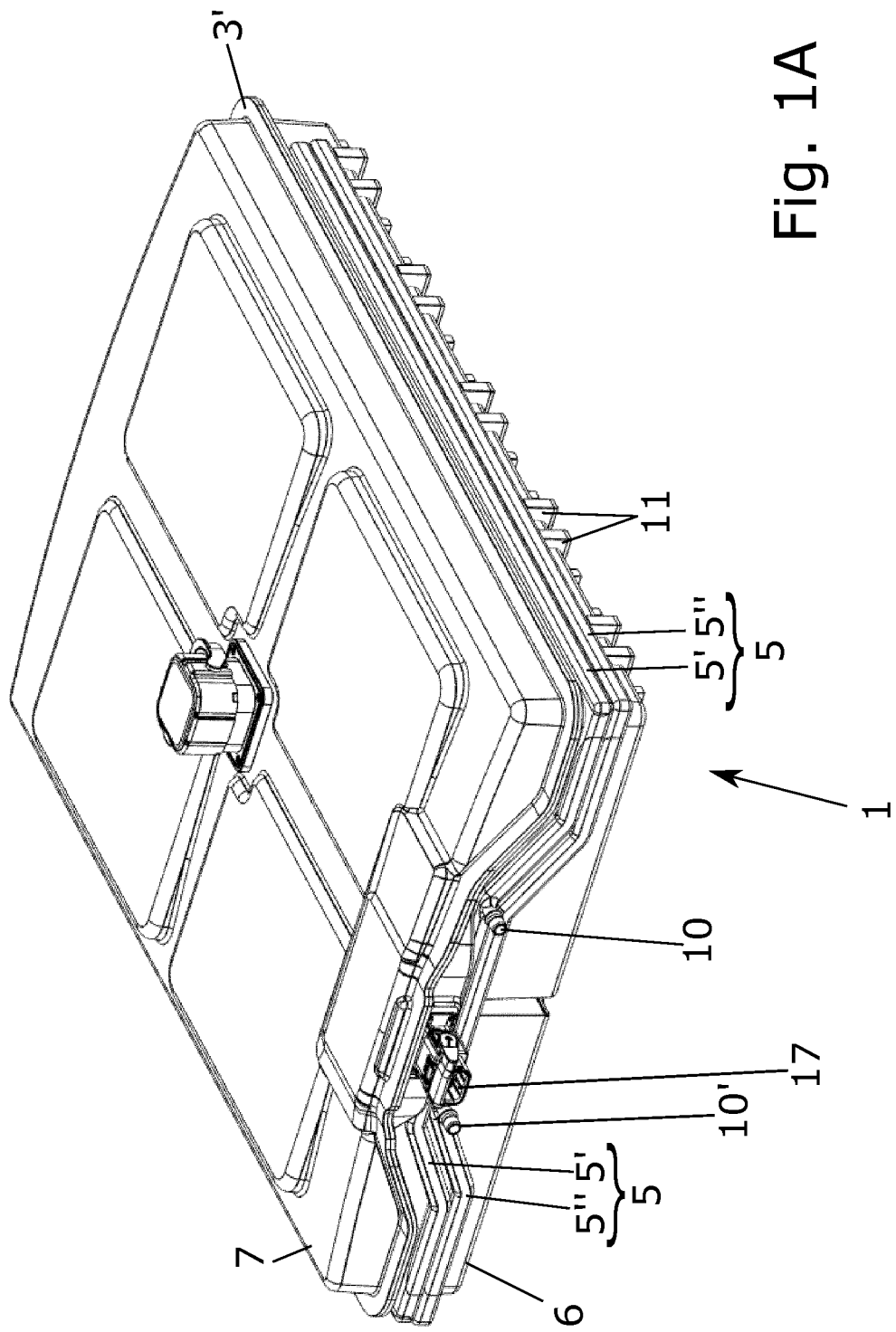
FIGS. 1A and 1B are perspective views from two different angles of a battery unit according to the invention.
Figure 1B:
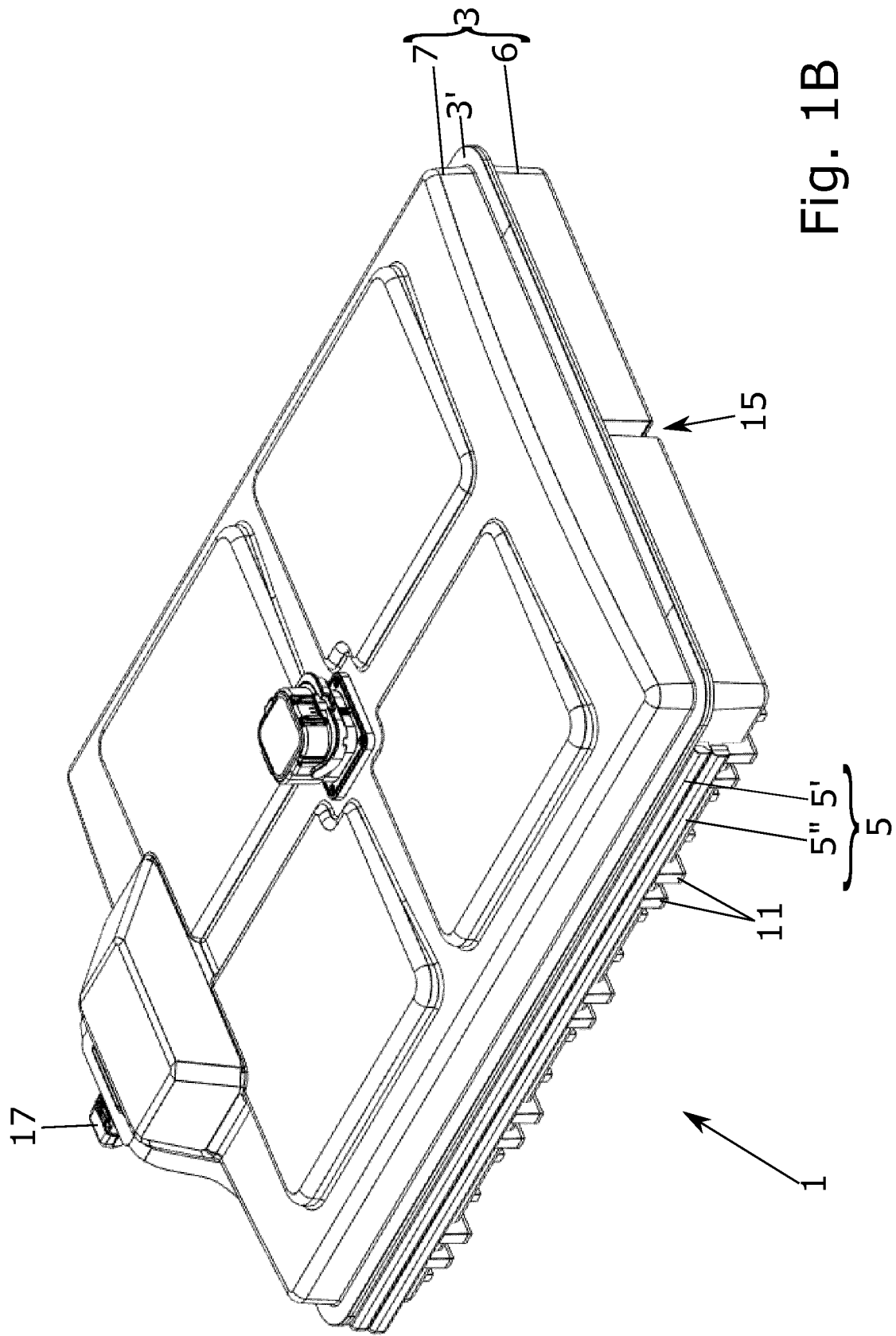
Figure 2:
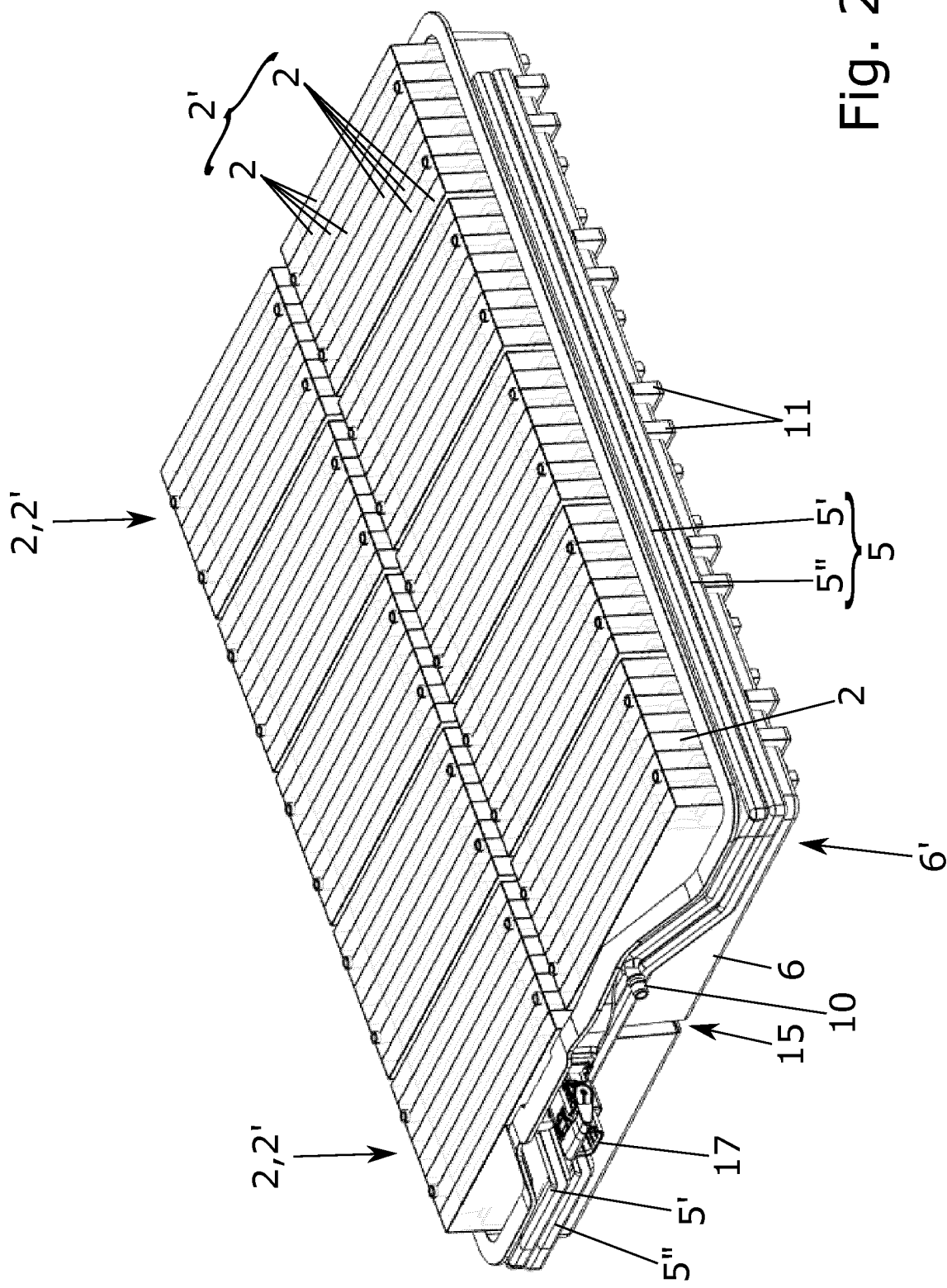
FIG. 2 is a perspective view similar to that of FIG. 1A, the cover being removed.
Figure 4A:
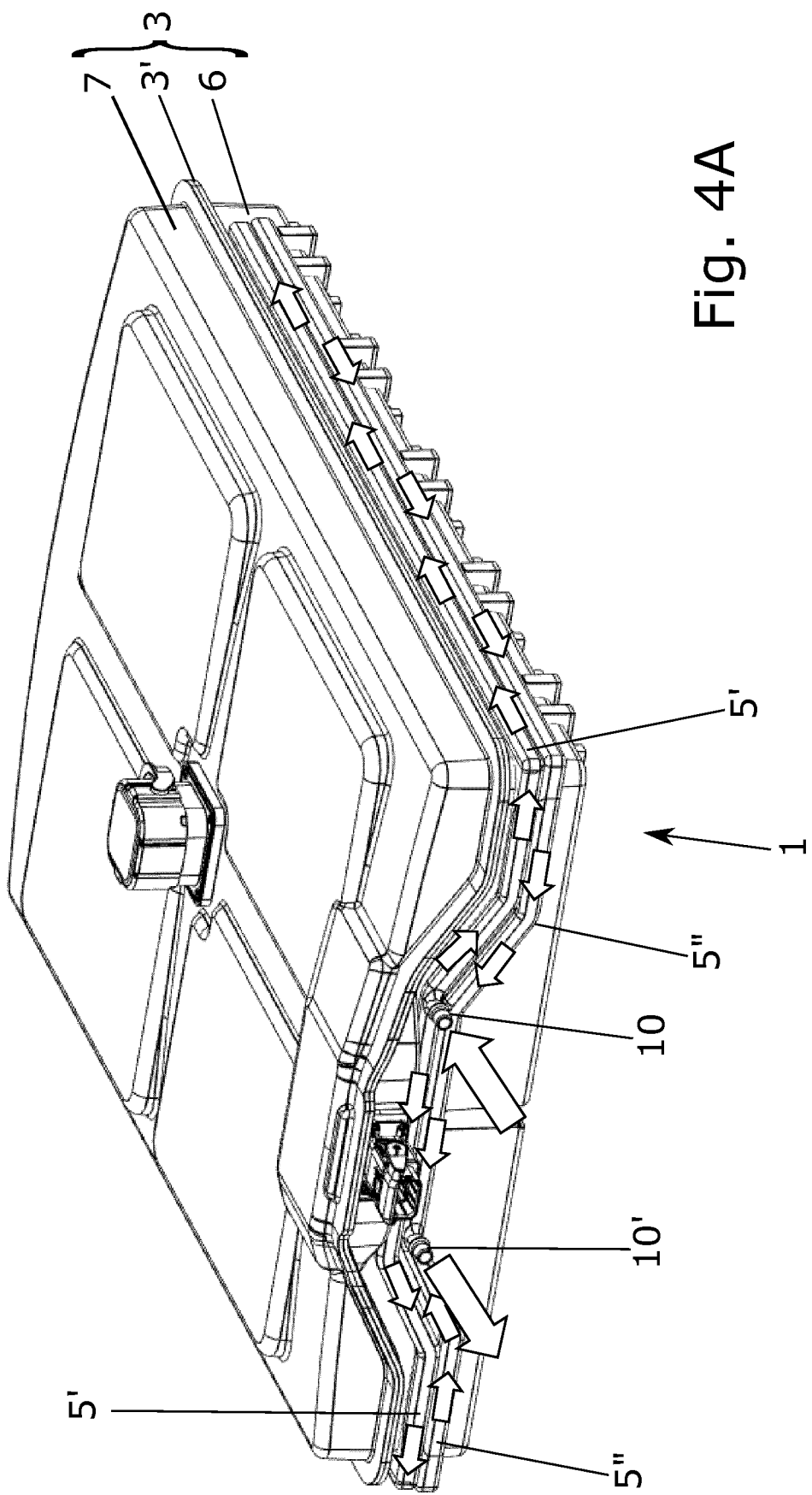
FIGS. 4A and 4B are perspective views from two different directions of a battery unit according to the invention, the circulation flows of the heat-transfer fluid in the distribution/collection means being schematically represented.
Figure 4B:
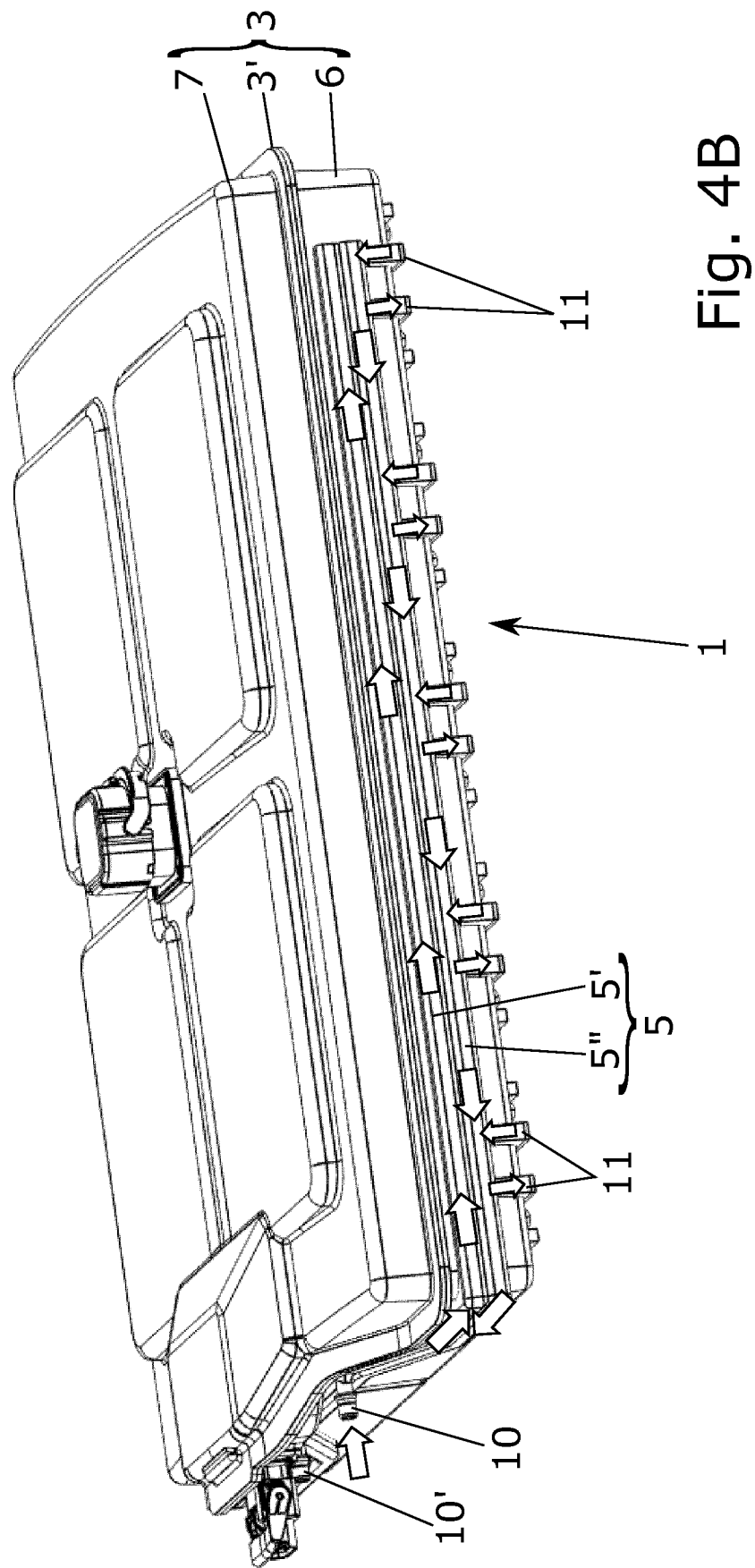
Figure 6:
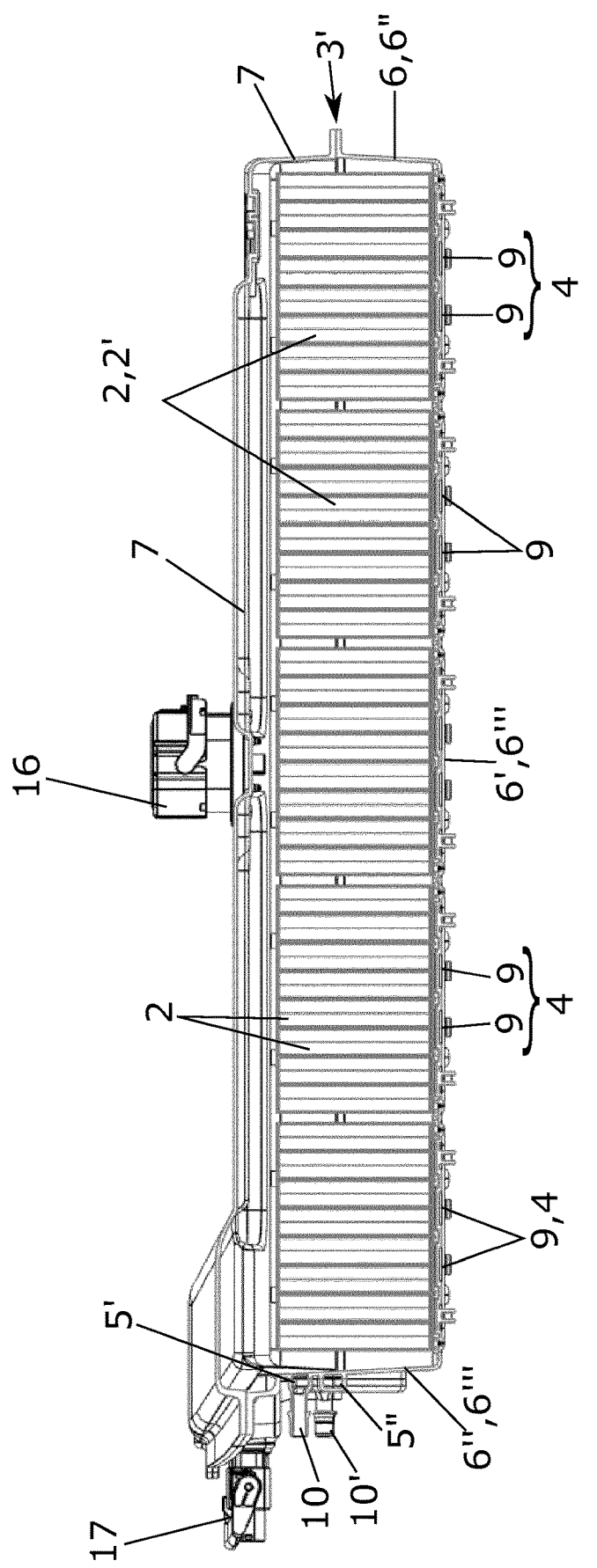
FIG. 6 is a cross-sectional view along another plane of the battery unit of FIGS. 1 and 4.

FIGS. 1, 4, 7 and 8 illustrate a battery unit 1, notably for a hybrid and/or electric motor vehicle, essentially comprising, on the one hand, a plurality of battery cells 2 or elements, if necessary grouped together physically and/or electrically in several blocks or modules 2', on the other hand, a housing 3 accommodating and surrounding said cells or elements 2 and, finally, means 4, 5 for regulating the temperature of said cells or elements 2 by circulation of heat-transfer fluid.

In accordance with the invention, the housing 3 is made of a plastic material and consists of a bottom tray 6, with a bottom 6' and lateral walls 6", and of a top cover 7, which are assembled peripherally, preferentially by screwing, and at least the tray 6 comprises means 4, 5 for distributing/collecting and circulating the heat-transfer fluid which are incorporated structurally in the body 6', 6" of said tray 6, by being preferentially formed at least partially of a single piece therewith.

The housing 3 thus consists of two parts 6 and 7 forming two half-shells, preferably each monobloc or of a single piece, which are mutually and tightly assembled in a single peripheral assembly zone 3'. This assembly of only two parts makes it possible to house and surround the cells 2 forming the battery, by encapsulating them in the housing 3 obtained, while limiting the joining zones to the minimum.

A production of the housing in a rigid plastic material (thermoplastic material, for example polypropylene, polyamide, polyester, etc., which is filled or not with additives and/or with fibers, such as glass fibers, carbon fibers, and includes or does not include a reinforcing grid) makes it possible to simultaneously obtain (by comparison to metallic housings) a better thermal insulation and a reduction of cost prices, and allows (by virtue of the wide variety and diversity of forms that can be produced) a possible incorporation of the distribution and collection means 5 and circulation means 4 in the same structure of the housing 3 during its production by assembly and during the production of each of its two components 6 and 7.

Advantageously, the means 4 and 5 are formed only partially and peripherally in the wall of the body of the tray 6 (they do not thereby weaken the structure), while contributing to the overall compactness of the housing 3 by their at least partial incorporation and their attachment to the body of the tray 6.

The incorporation of these means 4 and 5 in the housing 3, in particular the tray 6, makes it possible to dispense with the installation and tedious tight connection of ducts and hoses, while also avoiding the exposure of these means 4 and 5 to the outside environment (distribution/collection means 5 attached against the wall 6"').

The sealed assembly zone 3' of the tray 6 with the cover 7 can consist of at least one peripheral continuous contact strip, resulting from bringing the facing edges into contact under pressure by screwing, clipping or the like, or obtained by joining by material fusion between edges facing one another and with complementary configurations of the two constituent parts 6 and 7 of the housing 3.

A seal-tightness by compression seal can be produced at or between the contact strip(s) of the peripheral assembly zone 3'. By implementing a removable assembly (screwing, clipping, etc.), it is possible to perform tests on the cells 2 after assembly and easily proceed with the replacement of at least one module 2'.

In accordance with an embodiment avoiding any direct contact between the heat-transfer liquid fluid and the elements or cells 2, the tray 6 comprises, at its bottom 6' on which the cells or elements 2 are arranged, at least one internal portion of wall 8 in contact with said cells or elements 2, this or each internal portion of wall 8 defining, with the wall 6"' of the tray 6 of the housing 3, a sealed volume 9 for circulation of heat-transfer fluid linked to the distribution/collection means 5, this or these internal portion (s) of wall 8 forming, together with the wall 6"' of the tray 6, a bottom 6' of tray 6 which is on its surface at least partially, and preferentially mostly, double-walled.

Advantageously and as emerges from FIGS. 3, 5, 6 and 9 in particular, the bottom 6' of the tray 6 comprises at least one heat-transfer fluid circulation circuit 4 with surface extension, incorporated in the structure of the bottom 6' and in contact with the cells or elements 2 through the internal portion or portions of wall 8. This or each circuit 4 is advantageously subdivided into portions of circuit 9, each of which is preferentially associated with a module 2' and extends under a corresponding module 2'. Furthermore, said or each circulation circuit 4 is preferentially linked to the distribution/collection means 5 and formed between one or more internal portions of wall 8 in contact with the cells or elements 2' and the wall 6"' of the tray 6.

As the attached figures also show, the distribution/collection means 5 are arranged on at least a part of the lateral perimeter of the tray 6 and are formed in and/or on the outer face of the wall 6"' of said tray 6, which advantageously has a rectangular form, giving the housing 3 substantially a rectangular parallelepipedal form.

In the latter case, the distribution/collection means 5 can for example extend over three of the four sides of said rectangle.

According to a preferred embodiment, the distribution/collection means 5 comprise at least one duct 5' for supplying heat-transfer fluid and at least one duct 5" for collecting and discharging heat-transfer fluid. Each duct 5', 5" advantageously comprises a respective connection end-fitting 10, 10' and each duct 5', 5" is linked to the heat-transfer fluid circulation means 4, incorporated in the bottom 6' at least of the tray 6, by secondary or tapping lines 11 passing through the wall 6"' of said tray 6. Thus, the interfaces 10, 10' of fluidic connection with the outside, and the fluidic links with the circulation circuit or circuits 4, are also incorporated in the structure of the tray 6.

In order to be able to segment the exchange surface, for example in accordance with the grouping together of the cells 2 in modules or blocks 2', and to be able to impose a predetermined routing on the flow of heat-transfer liquid, the circulation means 4 incorporated in the body 6', 6" of the tray 6, preferentially in its bottom 6' between internal portions of wall 8 and the wall 6"' of said tray 6, comprise elementary circulation volumes 9 each formed between an internal portion of wall 8, in contact with the cells or elements 2, on the one hand, and the wall 6"' of the tray 6, on the other hand, and all linked fluidically either individually in series and collectively to the circulation means 4, or individually and in parallel to the circulation means 4.

Preferentially, each elementary circulation volume 9 has a general U, S or serpentine form, the free ends of said U, S or serpentine form being fluidically linked either to the respectively preceding and following elementary circulation volumes 9 in a series arrangement, or to the ducts 5, 5" of the circulation means 4, by the secondary or tapping lines 11. The U form notably is simple to produce and allows for very wide branches. However, other forms of elementary circulation circuit 9, such as an S or Z or serpentine form, are also possible.

According to a practical variant, the two branches of the U are substantially coupled to one another and each branch thus has a significant width, offering a maximum exchange surface area while making it possible to direct the circulation flow of the heat-transfer liquid fluid from the inlet to the outlet of the elementary volume 9 concerned (cf. FIGS. 3 and 9).

Figure 10:
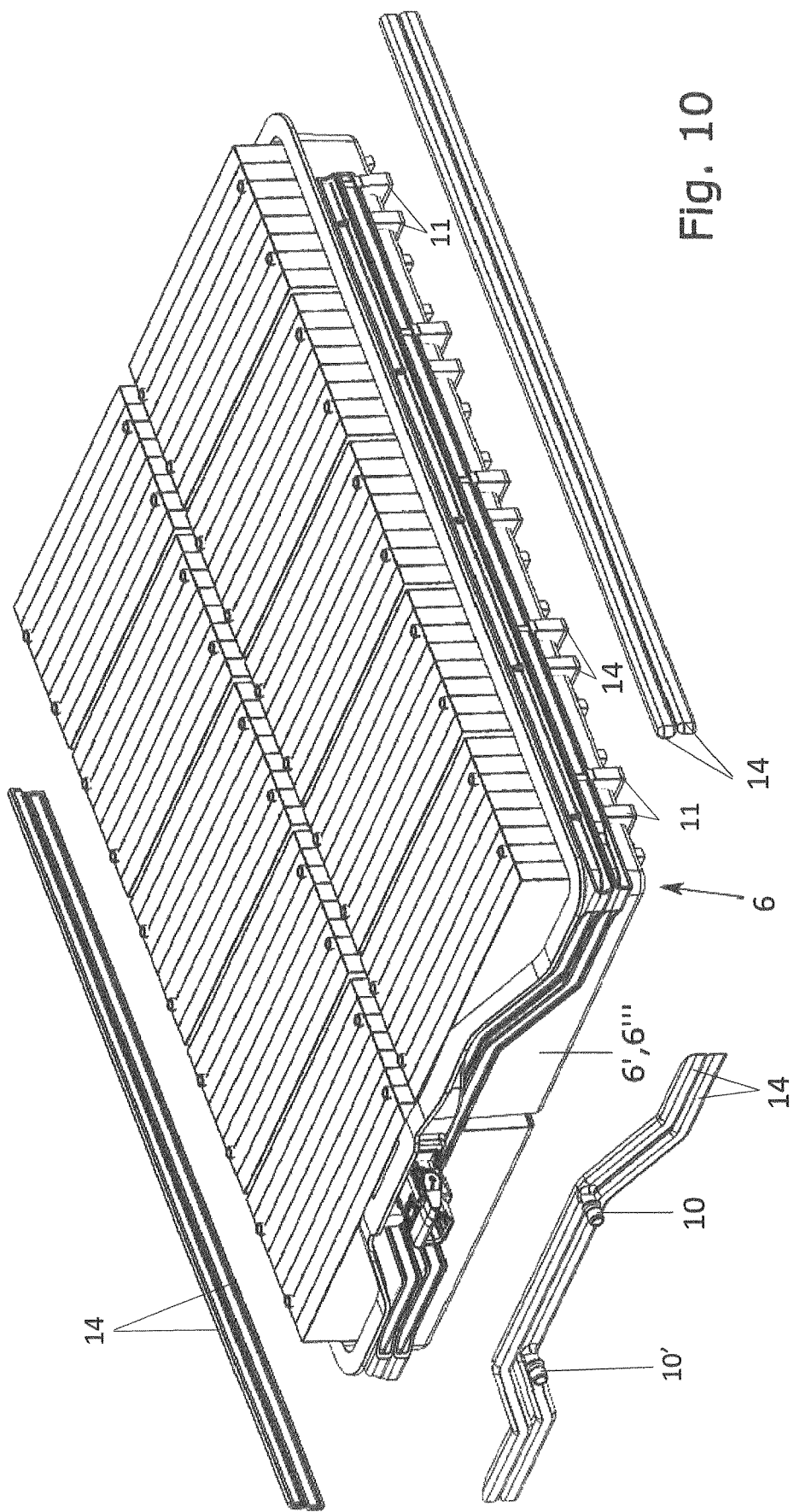
FIG. 10 illustrates, in the form of an exploded perspective view (for the distribution/collection means), the object of FIG. 2.

In accordance with a feature of the invention, illustrated by way of example by FIGS. 5 and 10, the supply ducts 5' and the collection and discharge ducts 5" of the distribution/ collection means 5, and if necessary the secondary or tapping lines 11, comprise tubular walls formed partially by the wall 6''' of the tray 6 and partially by the thermoplastic material 14 overmolded on said wall 6''' or by complementary wall portions 14 which are assembled by welding with said wall 6'''.

The distribution and the cutting of said tubular walls, between their parts formed by the wall 6''' of the tray 6 and their parts added by overmolding 14, depend on the possibilities of the mold for molding the tray 6 and on the complexity of configuration of the tray 6 itself.

The nature of the material and the thickness of the portions of wall 8, and the shaping of their faces in contact with the elements or cells 2 must be chosen to achieve a maximum heat exchange between these elements and the heat-transfer liquid fluid.

According to a preferred constructive variant, emerging for example from FIGS. 3, 5, 6 and 9, the or each internal portion of wall 8 consists of an added part, such as a plate, secured tightly with the wall 6''' of the bottom 6' of the tray 6, at a corresponding depression or cup 12 thereof, the or each internal portion of wall 8 being made of a material with high thermal conductivity, notably a metallic material or a thermoplastic material with enhanced heat-conducting properties.

Thus, the wall 6''' of the body of the tray 6, and the wall of the cover 7, can be made of a thermoplastic material with augmented mechanical and insulating properties (for example augmented by additives), while the internal portions of wall 8 have a high heat transfer coefficient.

Each depression of the wall 6''' of the bottom 6' of the tray will be able for example to be subdivided into two regions over a portion of its length by a partitioning wall, so as to constitute, when it is closed by an internal part of wall 8, a circulation volume 9 in the form of a U.

The tray 6 and, to a lesser extent, the cover 7, must have a sufficient mechanical strength to house and protect the battery modules 2' and can for example comprise stiffening ribs for that purpose.

Figure 7B:
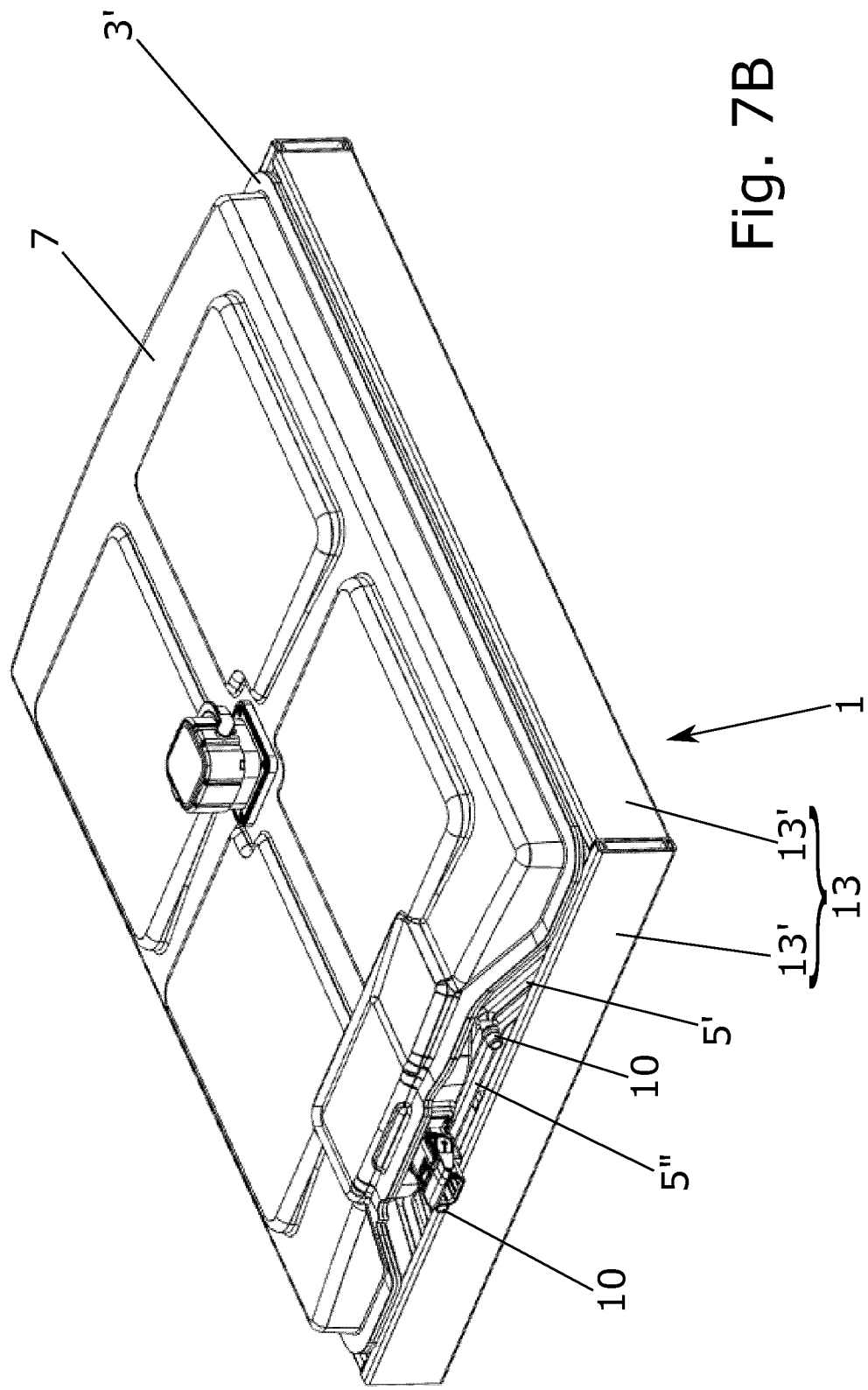

As a variant, or in a complementary fashion, to achieve a greater strength and rigidity, the tray 6 can comprise either a reinforcing structure 13 incorporated in the body 6', 6'' of the tray 6, for example overmolded by the thermoplastic material forming the wall 6''' of said tray 6 (not represented), or a reinforcing structure 13 cooperating externally by conjugation of forms with the thermoplastic wall 6''' of said tray 6, for example of the frame type notably providing a median and peripheral stiffening (FIGS. 7A and 7B).

In order to reinforce the stiffness of the bottom 6', and possibly increase the heat exchange zones between the heat-transfer fluid and the cells or elements 2, provision can be made for the tray 6 to comprise at least one subdividing internal wall 15, extending in a single piece from the bottom 6' (and preferentially between two opposing lateral walls 6''), advantageously cooperating with a reinforcing structure 13 and incorporating, if necessary, heat-transfer fluid circulation volumes, preferentially forming part of the circulation means 4 of the tray 6 and fluidically linked to the distribution/collection means 5 (FIGS. 1C, 3, 5, 7A).

The reinforcing structure 13 can for example comprise peripheral lateral walls 13', encircling the tray 6 and protecting the distribution 5' and collection/discharge 5'' ducts by covering them. A median wall 13'' of the structure 13 can, for its part, cooperate (by fitting) with a hollow subdividing internal wall 15, thus forming a stiffening median beam of the tray 6.

In order to even further increase the heat exchange surface area between the heat-transfer fluid and the cells or elements 2, provision can also be made for the cover 7 to also comprise means for distributing/collecting and circulating heat-transfer fluid incorporated structurally in the body of said cover 7, like the tray 6 and as described above. It can then advantageously have, at least partially, a double-wall structure providing circulation volumes, for example formed between the internal portions of wall and the outer wall of said cover 7, said internal portions of wall being preferentially in contact with the top parts of the battery cells or elements 2 and the distribution/collection means of the cover being advantageously fluidically linked to the distribution/collection means 5 of the tray 6.

Figure 8A:
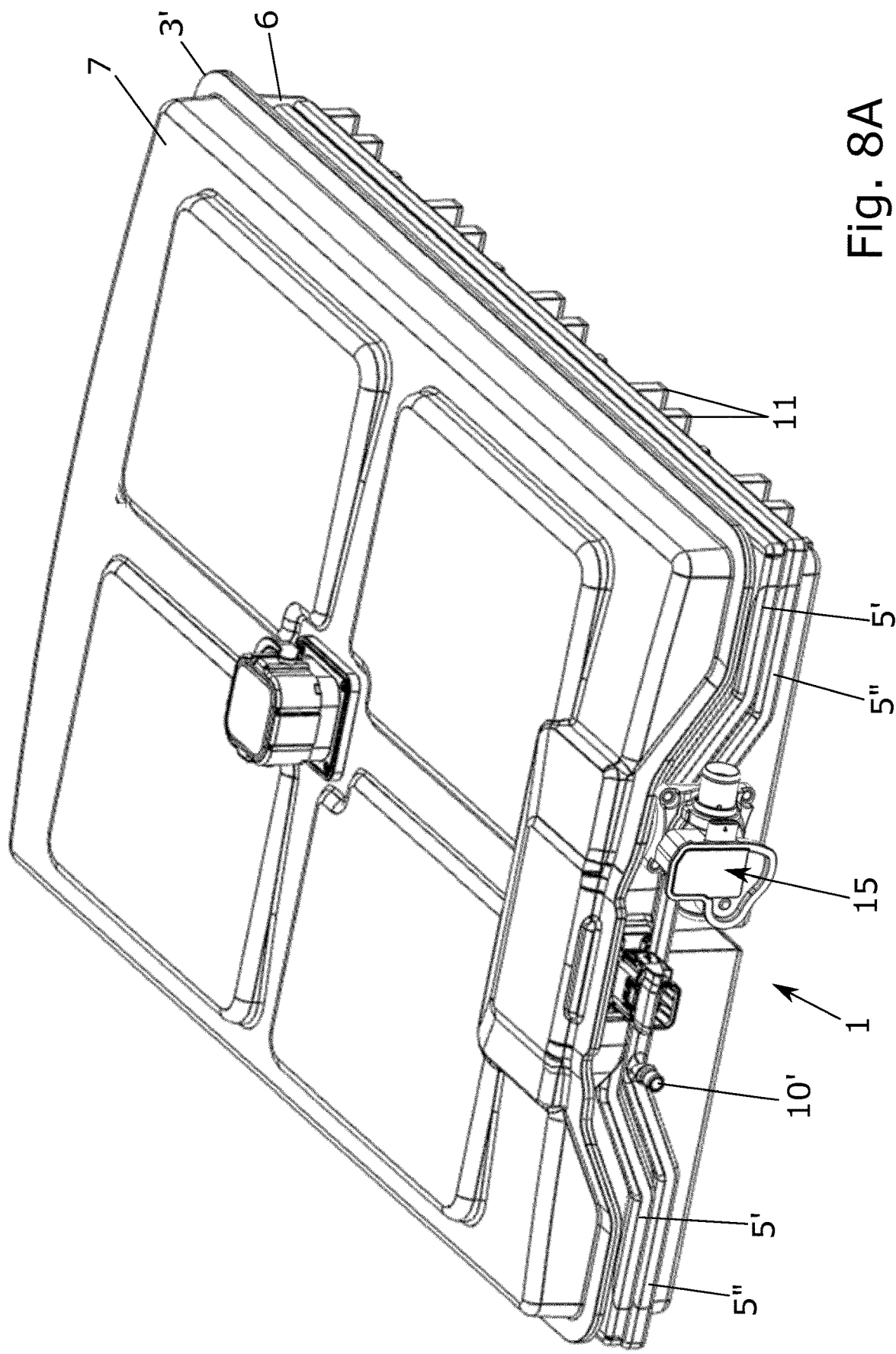

According to an additional feature of the invention, emerging from FIGS. 8A, 8B and 9, the housing 3 can incorporate one or more functionalities in connection with the management of the heat-transfer liquid.

Thus, a means 16 for controlling the temperature, the circulation and/or the distribution/collection of the heat-transfer liquid can be incorporated structurally, even materially, at least partly in the housing 3, for example at the distribution/collection means 5 or the lateral walls 6'' of the tray 6.

Another subject of the invention is a motor vehicle, in particular electric or hybrid, characterized in that it comprises at least one battery unit 1 as described above. This battery unit 1 also comprises at least one internal temperature measurement means, means for electrically connecting the cells or elements 2 to one another and external connection means 17, the latter being advantageously partially formed with or in the wall 6''' of the tray 6 and/or the wall of the cover 7.

Obviously, the invention is not limited to the embodiments described and represented in the attached drawings. Modifications are still possible, notably from the point of view of the formation of the various elements or by substituting technical equivalents, without in any way departing from the scope of protection of the invention.

The invention claimed is:

1. A battery unit comprising:
    a plurality of battery cells or elements grouped together physically and/or electrically in several blocks or modules;
    a housing accommodating and surrounding said cells or elements; and
    a means for regulating the temperature of said cells or elements by circulation of heat-transfer fluid,
    wherein the housing is made of a plastic material and comprises:
    a molded bottom tray, with a bottom and lateral walls forming the body of the molded bottom tray as a single molded piece, and
    a top cover, which are assembled together peripherally
    wherein at least the bottom tray has means for distributing and collecting and circulating the heat-transfer fluid which are incorporated structurally in the body of said bottom tray as part of said single molded piece, and
    wherein the means for distribution and collection has at least one duct for supplying heat-transfer fluid, and at least one duct for collecting and discharging heat-transfer fluid, that are arranged on at least a part of a lateral perimeter of the bottom tray and are formed in and/or on an outer face of the walls of the body of said bottom tray,
    wherein the bottom of the bottom tray has at least one circuit for circulation of heat-transfer fluid with extension to a surface thereof, incorporated in the structure of the bottom of the bottom tray and in contact with the cells or elements through internal portion or portions of the walls of said bottom tray, such at least one circuit being subdivided into circuit portions, and in that said at least one circulation circuit is linked to the distribution and collection means and is formed between one or more internal portions of walls of the bottom tray in contact with the cells or elements and the walls of the tray, and wherein the circulation means incorporated in the body of the bottom tray have elementary circulation volumes each formed between an internal portion of wall in contact with the cells or elements and the wall of the bottom tray, with all said elementary circulation volumes linked fluidically either in series to the circulation means, or in parallel to the circulation means.

2. The battery unit as claimed in claim 1, wherein the bottom tray further comprises, at its bottom on which the cells or elements are arranged, at least one internal portion of wall in contact with said cells or elements, this or each internal portion of wall defining, with the wall of the bottom tray of the housing, a volume for circulation of heat-transfer fluid linked to the distribution and collection means, this or these internal portions of wall forming, together with the wall of the bottom tray, a bottom of the bottom tray which is on its surface at least partially double-walled.

3. The battery unit as claimed in claim 1, wherein the at least one circuit for circulation of heat-transfer fluid which is subdivided into circuit portions are associated with a module extending under a corresponding module.

4. The battery unit as claimed in claim 1, wherein the bottom tray has a rectangular form.

5. The battery unit as claimed in claim 1, wherein each of said ducts for supplying or said ducts for collection and discharge of heat transfer fluid has a respective connection end-fitting and is connected to the heat-transfer fluid circulation means, incorporated in at least the bottom of the bottom tray, by secondary or tapping lines passing through the wall of said bottom tray.

6. The battery unit as claimed in claim 1, wherein the circulation means incorporated in the body of the tray are in its bottom between internal portions of a wall and the wall of said bottom tray.

7. The battery unit as claimed in claim 6, wherein each elementary circulation volume has a generally U shaped, the free ends of said U shaped form being fluidically linked either one of, respectively preceding and following elementary circulation volumes in a series arrangement, or to the ducts of the circulation means, by secondary or tapping lines.

8. The battery unit as claimed in claim 5, wherein the supply and discharge ducts of the distribution and collection means, and optionally the secondary or tapping lines, comprise tubular walls that are formed partially by the wall of the bottom tray and partially by the thermoplastic material overmolded on said wall or by complementary portions of wall which are assembled together by welding.

9. The battery unit as claimed in claim 2, wherein said at least one internal portion of wall includes an added plate, tightly secured with the wall of the bottom of the bottom tray, at a corresponding depression or cup thereof, said at least one internal portion of wall being made of a material with high thermal conductivity.

10. The battery unit as claimed in claim 1, wherein the bottom tray comprises a reinforcing structure incorporated in the body of the bottom tray, overmolded by the thermoplastic material forming the wall of said bottom tray.

11. The battery unit as claimed in claim 1, wherein the bottom tray comprises a reinforcing structure that is a providing median and peripheral stiffening.

12. The battery unit as claimed in claim 1, wherein the bottom tray comprises at least one subdividing internal wall, extending in a single piece from the bottom, and cooperating with a reinforcing structure, said subdividing internal wall forming part of the circulation means of the tray and fluidically linked to the distribution and collection means.

13. The battery unit as claimed in claim 1, wherein the cover also comprises means for distributing and collecting and circulating heat-transfer fluid incorporated structurally in the body of said cover, and has and at least partial double-wall structure providing circulation volumes formed between the internal portions of wall and the outer wall of said cover, said internal portions of wall being in contact with the top parts of the battery cells or elements and the distribution and collection means of the cover being linked fluidically to the distribution and collection means of the tray.

14. The battery unit as claimed in claim 1, wherein a means for controlling the temperature, the circulation and/or the distribution of the heat-transfer liquid is at least partly incorporated structurally in the housing at the distribution and collection means or the lateral walls of the bottom tray.

15. The battery unit as claimed in claim 1, further comprising at least one internal temperature measurement means, means for electrically connecting the cells or elements to one another and external connection means, said external connection means partially formed with or in the wall of the bottom tray and/or the wall of the cover.

16. A battery unit comprising:

a plurality of battery cells or elements grouped together physically and/or electrically in several blocks or modules;

a housing accommodating and surrounding said cells or elements; and a means for regulating the temperature of said cells or elements by circulation of heat-transfer fluid, wherein the housing is made of a plastic material and comprises:

a molded bottom tray, with a bottom and lateral walls forming the body of the molded bottom tray as a single molded piece, and a top cover, which are assembled together peripherally wherein at least the bottom tray has means for distributing and collecting and circulating the heat-transfer fluid which are incorporated structurally in the body of said bottom tray as part of said single molded piece, and wherein the means for distribution and collection has at least one duct for supplying heat-transfer fluid, and at least one duct for collecting and discharging heat-transfer fluid, that are arranged on at least a part of a lateral perimeter of the bottom tray and are formed in and/or on an outer face of the walls of the body of said bottom tray, wherein the bottom of the bottom tray has at least one circuit for circulation of heat-transfer fluid with extension to a surface thereof, incorporated in the structure of the bottom of the bottom tray and in contact with the cells or elements through internal portion or portions of the walls of said bottom tray, such at least one circuit being subdivided into circuit portions each of which are associated with a module extending under a corresponding module, and in that said at least one circulation circuit is linked to the distribution and collection means and is formed between one or more internal portions of walls of the bottom tray in contact with the cells or elements and the walls of the tray, and wherein the circulation means incorporated in the body of the bottom tray are in its bottom between internal portions of a wall and the wall of said bottom tray, and have elementary circulation volumes each formed between an internal portion of wall in contact with the cells or elements and the wall of the bottom tray, with all said elementary circulation volumes linked fluidically either in series to the circulation means, or in parallel to the circulation means.

17. A battery unit comprising:

a plurality of battery cells or elements grouped together physically and/or electrically in several blocks or modules;

a housing accommodating and surrounding said cells or elements; and a means for regulating the temperature of said cells or elements by circulation of heat-transfer fluid, wherein the housing is made of a plastic material and comprises:

a molded bottom tray, with a bottom and lateral walls forming the body of the molded bottom tray as a single molded piece, and a top cover, which are assembled together peripherally wherein at least the bottom tray has means for distributing and collecting and circulating the heat-transfer fluid which are incorporated structurally in the body of said bottom tray as part of said single molded piece, and wherein the means for distribution and collection has at least one duct for supplying heat-transfer fluid, and at least one duct for collecting and discharging heat-transfer fluid, that are arranged on at least a part of a lateral perimeter of the bottom tray and are formed in and/or on an outer face of the walls of the body of said bottom tray, wherein the bottom of the bottom tray has at least one circuit for circulation of heat-transfer fluid with extension to a surface thereof, incorporated in the structure of the bottom of the bottom tray and in contact with the cells or elements through internal portion or portions of the walls of said bottom tray, such at least one circuit being subdivided into circuit portions, and in that said at least one circulation circuit is linked to the distribution and collection means and is formed between one or more internal portions of walls of the bottom tray in contact with the cells or elements and the walls of the tray, wherein the circulation means incorporated in the body of the bottom tray have elementary circulation volumes each formed between an internal portion of wall in contact with the cells or elements and the wall of the bottom tray, with all said elementary circulation volumes linked fluidically either in series to the circulation means, or in parallel to the circulation means, and wherein said at least one internal portion of wall includes an added plate, tightly secured with the wall of the bottom of the bottom tray, at a corresponding depression or cup thereof, said at least one internal portion of wall being made of a material with high thermal conductivity.

* * * * *